Dec. 7, 1948.  R. B. HUNTER  2,455,491
CONTROL OF ALTERNATING CURRENT MOTORS
Filed April 28, 1944  2 Sheets-Sheet 1

Inventor
Richard B. Hunter
By [signature]
Attorney

Dec. 7, 1948.   R. B. HUNTER   2,455,491
CONTROL OF ALTERNATING CURRENT MOTORS
Filed April 28, 1944
2 Sheets-Sheet 2

Inventor
Richard B. Hunter
By
Attorney

Patented Dec. 7, 1948

2,455,491

UNITED STATES PATENT OFFICE 2,455,491

CONTROL OF ALTERNATING CURRENT MOTORS

Richard B. Hunter, Shorewood, Wis., assignor to Cutler-Hammer, Inc., Milwaukee, Wis., a corporation of Delaware Application April 28, 1944, Serial No. 533,147

14 Claims. (Cl. 318—203)

1

This invention relates to improvements in control of alternating current motors and although not limited thereto is particularly advantageous in control of such motors where employed for hoisting and lowering widely varying loads.

In the application of R. P. Anderson, Serial No. 482,273, filed April 8, 1943, now Patent 2,436,413, issued February 24, 1948, and assigned to the assignee of the instant application there is disclosed a very satisfactory control for motors employed in the aforementioned service, which control through the medium of an adjustable auto-transformer unbalances the motor primary and affords multi-speed lowering comparable to that obtainable in a direct current system. However, an adjustable auto-transformer requires protection against short-circuiting of the sections thereof in commutating its connections and hence is better suited to the electromagnetic type of control than to mechanical types including the drum type, whereas the drum type of control is frequently preferred. Of course by special design of the control drum safe control of the auto-transformer may be afforded, but the drum then becomes complicated and costly.

The present invention has among its objects to afford lowering control having substantially the same speed torque characteristics as where the aforementioned adjustable auto-transformer is employed, but without resort to circuit commutation of the auto-transformer and through the medium of means which may be controlled by a drum of relatively simple construction and low cost.

Another object is to provide a system equally well suited to the electromagnetic type of control means and obviating need of the special provisions required where adjustment of the auto-transformer is necessary.

Various other objects and advantages of the invention will hereinafter appear.

According to the present invention it is proposed to employ an auto-transformer for unbalancing the motor primary but instead of adjusting the auto-transformer to obtain the desired speed torque curves it is proposed to vary the speed torque characteristics through impedance control of the motor primary. The possibility of using primary resistance alone without resort to an auto-transformer is known, but the combination of auto-transformer and impedance herein disclosed has advantages over control through resistance alone as well as over control by an auto-transformer alone. This combination affords for a given lowering speed a higher torque

2 than has been obtained by control through resistance alone, whereas advantages thereof over the adjustable transformer have been hereinbefore mentioned.

The accompanying drawings illustrate an embodiment of the invention which will now be described, it being understood that the embodiment illustrated is susceptible of various modifications without departing from the scope of the appended claims. In the drawings, Figure 1 is a diagrammatic showing of a motor and a complete controller therefor of the drum type;

Figs. 2a to 7a are vector showings for the circuit commutations of Figs. 2 to 7, respectively, these vectors being for zero speed and not necessarily quantitative.

Figure 1:
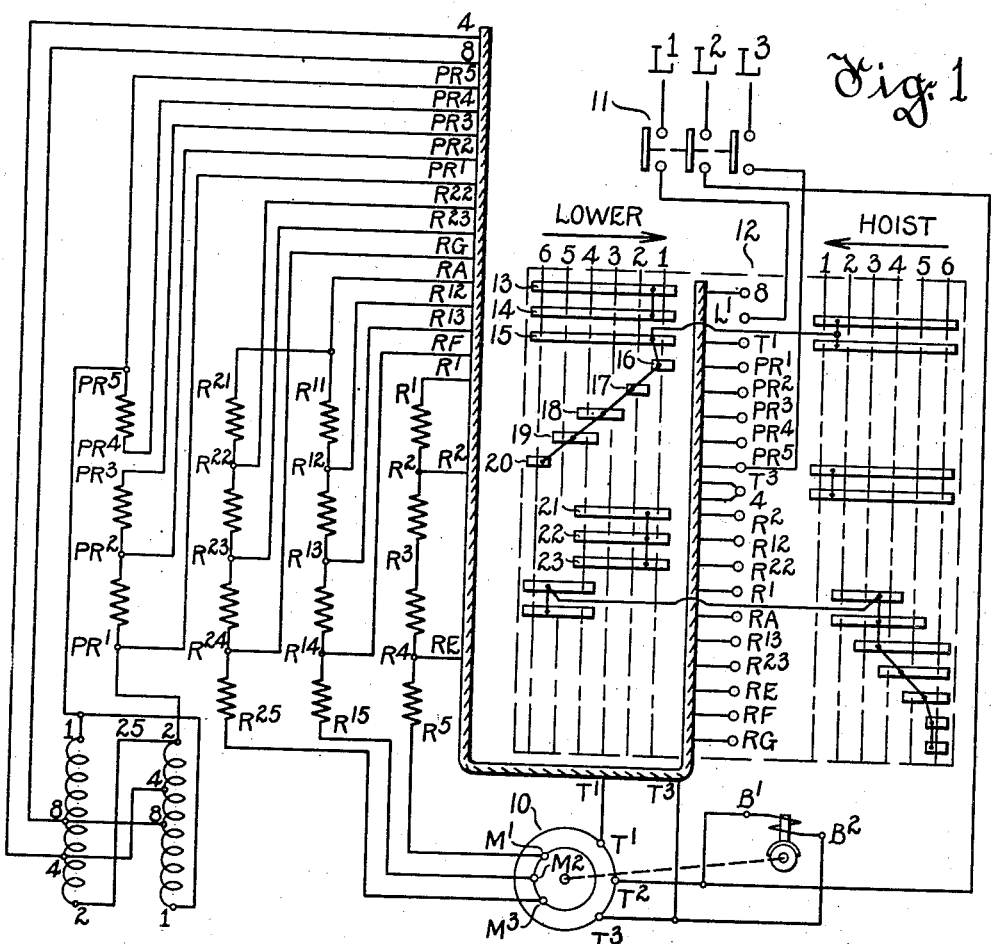

Referring to Fig. 1, the same illustrates a slip ring motor 10 having a stator to be supplied from supply lines $L^1$, $L^2$ and $L^3$, the stator having terminals $T^1$, $T^2$ and $T^3$. The rotor of the motor has terminals $M^1$, $M^2$ and $M^3$ and said rotor has for control thereof in a known manner series resistors for its several phases, namely resistors $R^1$ to $R^5$, $R^{11}$ to $R^{15}$ and $R^{21}$ to $R^{25}$. Also as is customary the motor has associated therewith a brake having a shunt winding, its terminal $B^1$ thereof connected to motor terminal $T^2$ and with its terminal $B^2$ connected to motor terminal $T^3$.

The connections between the stator of motor 10 and the supply lines include a triple pole switch 11 preferably of the electromagnetic type to be controlled as by drum contacts not shown or in any other preferred manner. One pole of the switch 11 affords a direct connection from line $L^2$ to the motor terminal $T^2$, whereas the connections between the motor and lines $L^1$ and $L^3$ must be made through the drum type controller 12.

The drum controller 12 is of conventional form comprising two sets of contact segments and an intermediate set of contact fingers. As will be understood, when the segments stand in that relation to the contact fingers depicted in the drawing the drum is in off position from which it is movable in one direction to engage with certain of the fingers, the hoisting segments or alternatively in a reverse direction to engage with certain of said fingers the lowering segments.

The hoisting segments are arranged to accomplish hoisting control in a well known manner and accordingly this portion of the control will not be described in detail. For simplicity of illustration, Fig. 1 shows the circuit connections between the motor and the drum in cable form, but the drawing employs customary reference characters enabling all circuits to be readily traced. Thus for example it will be understood that contact finger $T^1$ has a direct connection with motor terminal $T^1$, whereas contact finger $R^{12}$ has direct connection with a common point $R^{12}$ of resistors $R^{11}$—$R^{12}$ and $R^{12}$—$R^{13}$.

The lowering segments of the drum comprise interconnected segments 13 and 14 which engage and bridge contact fingers 8 and $L^1$ in all of the six lowering positions of the drum. Also a segment 15 engages contact finger $T^1$ in all lowering positions of the drum, this segment being interconnected with segments 16, 17, 18, 19 and 20 which progressively engage contact fingers $PR^1$, $PR^2$, $PR^3$, $PR^4$ and $PR^5$. Segments 16 and 17 engage their respective fingers only in the first and second positions, respectively, of the drum. Segment 18 engages its respective finger in the third and fourth positions of the drum, while segment 19 engages its respective finger in fourth and fifth positions of the drum, segment 20 engaging its respective finger only in the sixth position of the drum. Additionally the lowering section of the drum comprises interconnected segments 21, 22 and 23 to respectively engage contact fingers $R^2$, $R^{12}$ and $R^{22}$ in the first four lowering positions of the drum, and a pair 24 of interconnected segments to bridge contact fingers $R^1$ and RA in the fourth, fifth and sixth positions of the drum.

The drum contact segments and fingers above described with the exception of segments 21 to 24 and their respective fingers are provided for control of the motor primary through the medium of an auto-transformer 25 and impedances $PR^5$—$PR^4$, $PR^3$—$PR^2$ and $PR^2$—$PR^1$ which it will be assumed comprise resistors although they might comprise inductors or capacitors. The circuits for the transformer and the resistances just mentioned are shown in simplified form in Figs. 2 to 7.

Prior to considering the primary connections it is to be noted that in the first four lowering positions of the drum all secondary resistance is included in circuit except resistors $R^1$—$R^2$, $R^{11}$—$R^{12}$, and $R^{11}$—$R^{22}$ which are short-circuited by the bridging of contact fingers $R^2$, $R^{12}$ and $R^{22}$ by the segments 21, 22 and 23. On the other hand, the resistors just mentioned are included in the motor secondary circuit in the fifth and sixth lowering positions of the drum as the result of disengagement of segments 21, 22 and 23 from their respective contact fingers, and engagement of segments 24 with their contact fingers to connect terminal $R^1$ of resistor $R^1$—$R^2$ to the common point of the resistors of the other phases.

Figure 2:
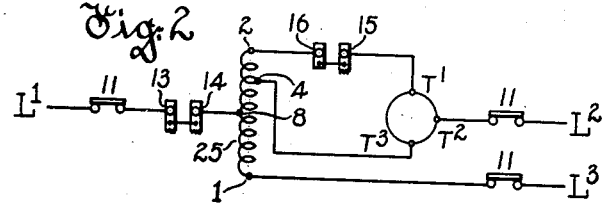
Figs. 2 to 7 show diagrammatically in simplified form circuit commutations of the motor which are afforded by the controller of Fig. 1.
Figure 2A:
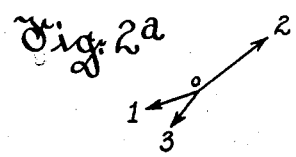

Referring to Fig. 2, it shows the circuit connections for the motor primary as established in the first lowering position of the drum, assuming the line switch 11 to be closed. Considering these connections it will be observed that the motor terminal $T^2$ has a direct connection to line $L^2$ through one pole of the switch 11, while a second pole of switch 11 connects to line $L^3$ the lower terminal 1 of the auto-transformer winding 25, the upper terminal of said winding being connected to motor terminal $T^1$ by engagement of drum contact segments 15 and 16 with their cooperating contact fingers $T^1$ and $PR^1$ in the first lowering position of the drum. Transformer winding 25 is connected at a center point 8 to line $L^1$ through a third pole of main switch 11 and drum segments 13 and 14 which in the first lowering position of the drum bridge their respective contact fingers 8 and $L^1$. Motor terminal $T^3$ has a direct and permanent connection to the transformer 25 at a selected point 4 between its center point and its upper terminal 2, and such connections of the motor are like those afforded in the controller disclosed in the earlier application aforementioned with consequent over-voltage unbalancing of the motor primary as depicted in the vector showing of Fig. 2ª and with speed torque characteristics as depicted by curve 1 of Fig. 8. As depicted by curve 1 of Fig. 8, the motor is at zero speed capable of exerting some hoisting torque, but this torque is too small to prevail over the weight of an empty hook and friction.

As will be apparent from Fig. 1, the aforedescribed connections between line $L^1$ and the transformer winding, also between line $L^3$ and the transformer, and between the transformer and motor terminal $T^3$ remain the same for all lowering positions of the drum, assuming the main switch 11 to remain closed.

Figure 3:
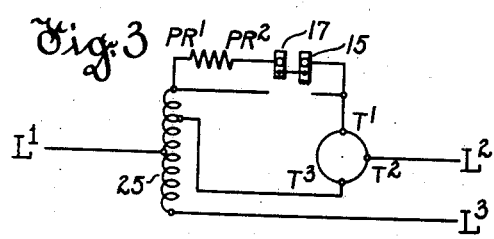
Figure 3A:
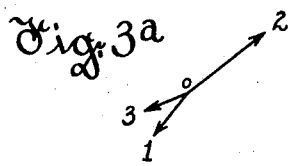

Referring to Fig. 3, it shows the motor primary connections established in the second lowering position of the drum, the change effected being introduction of resistor $PR^1$—$PR^2$ into the connection between the transformer and motor terminal $T^1$. This is effected by engagement of the drum contact fingers 16 and 17 with their respective fingers to bridge the same and by disengagement of contact segment 16 from its contact finger. This change in connections effects the vector change shown in Fig. 3ª, phase 1 now leading phase 3 instead of lagging phase 3 as in Fig. 2ª. The speed torque characteristic of the motor then becomes that depicted by curve 2 of Fig. 8, the motor then being capable at zero speed of exerting a small lowering torque.

Figure 4:
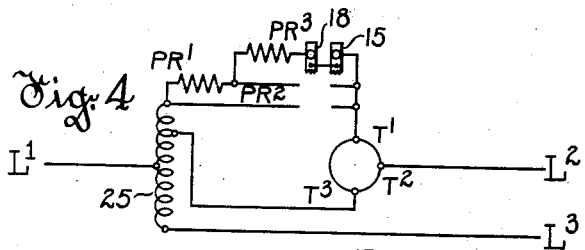
Figure 4A:
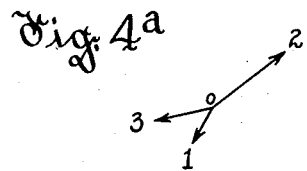

Referring to Fig. 4, it shows the primary connections established with the drum in its third lowering position, the change effected being that of inclusion of a second step of resistance $PR^2$—$PR^3$ between the transformer and the motor terminal $T^1$. This change is effected by engaging contact segments 15 and 18 with their respective fingers $T^1$ and $PR^3$ to bridge the same and by disengaging segment 17 from its respective finger to interrupt the direct connection between resistor $PR^1$—$PR^2$ and the motor terminal $T^1$. This change in connections effects the vector change shown in Fig. 4ª and the change in speed torque characteristic depicted by curve 3 of Fig. 8 which depicts an increased lowering torque.

Figure 5:
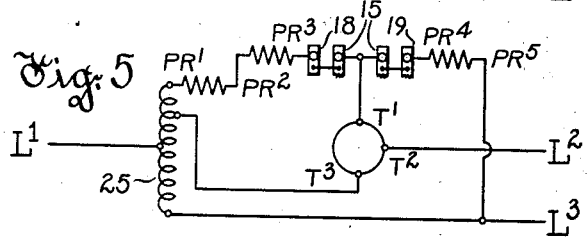
Figure 5A:
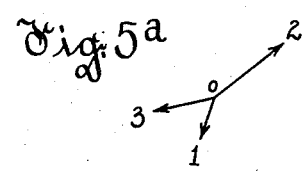

Referring to Fig. 5, it shows the primary connections established in the fourth lowering position of the drum, the change effected being that of connecting motor terminal $T^1$ to line $L^3$ through resistor $PR^4$—$PR^5$ while preserving the connections of Fig. 4. This change in connections is effected by the segments 15 and 19 bridging contact fingers $T^1$ and $PR^4$ and it effects the vector change shown in Fig. 5ª and produces the speed torque characteristics depicted by curve 4 of Fig. 8, with an increased lowering torque.

Figure 6:
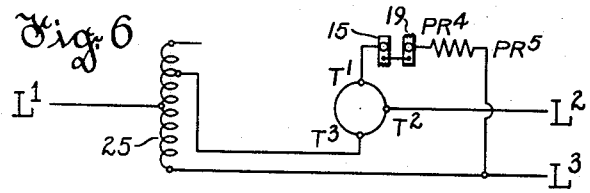
Figure 6A:
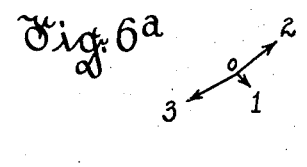

Referring to Fig. 6, it shows the primary connections established with the drum in its fifth lowering position, the change in connections being that effected by disengagement of segment 18 from its respective contact finger to interrupt the connection between motor terminal T¹ and the transformer. This results in the vector change depicted in Fig. 6ᵃ and the change in speed torque characteristic depicted by curve 5 of Fig. 8, with a further increase in lowering torque.

Figure 7:
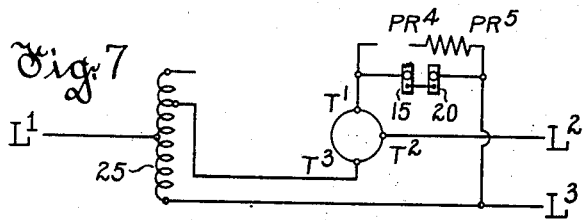
Figure 7A:
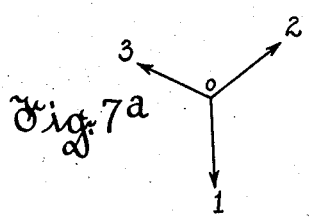

Referring to Fig. 7, the same shows the circuit connections established with the drum in its sixth lowering position, the change effected comprising direct connection of motor terminal T¹ with line L³ by engagement of segments 15 and 20 with their respective contact fingers and by disengagement of segment 19 from its contact finger. This change effects the vector change depicted in Fig. 7ᵃ with a consequent change in speed torque characteristic, as depicted by curve 6 of Fig. 8.

Figure 8:
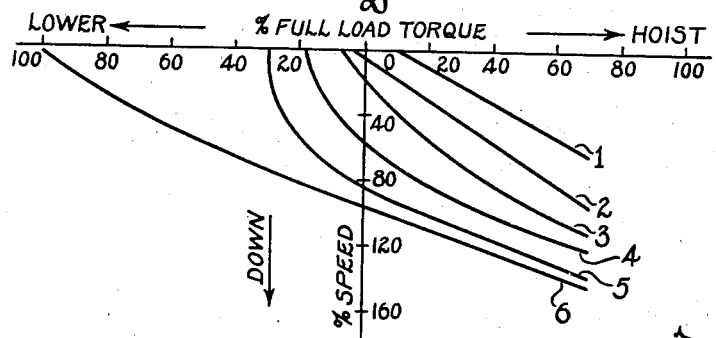
Fig. 8 depicts approximately only, the speed torque characteristics obtainable through the circuit commutations illustrated in Figs. 2 to 7.

As will be apparent from the curves of Fig. 8, the control thus afforded thus very closely approximates for both light and heavy loads the control afforded by the aforementioned adjustable transformer, with a torque for any given speed which is relatively high although slightly lower than that obtainable with the aforementioned adjustable auto-transformer type of control.

As will also be apparent, the control illustrated involves the problem of shifting the connection of terminal T¹ from the auto-transformer over to line L³ for certain results while always having some connection for said motor terminal, and as hereinbefore indicated this problem may be met through use of impedances other than of the resistor type.

What I claim as new and desire to secure by Letters Patent is:

1. In a braking system for an alternating current motor, the combination with means comprising an auto-transformer to supply power to the motor primary with voltage unbalance of the motor primary for high braking action of the motor, of impedance and means to include said impedance in circuit with the motor primary while under the influence of said auto-transformer, for reduced braking action of the motor.

2. In a braking system for an alternating current motor, the combination with means comprising an auto-transformer to supply power to the motor primary with voltage unbalance of the motor primary for high braking action of the motor characterized by some torque of the motor at zero speed, of impedance and means to include said impedance in circuit with the motor primary while under the influence of said auto-transformer, for reduced braking action of the motor characterized by a reversed torque of the motor at zero speed.

3. In a braking system for an alternating current motor, the combination with means comprising an auto-transformer to supply power to the motor primary with voltage unbalance of the motor primary for high braking action of the motor, of impedance and means to subject the motor primary while under the influence of said auto-transformer to influence by said impedance to reduce the braking action of the motor to different degrees selectively.

4. In a braking system for an alternating current motor, the combination with means comprising an auto-transformer to supply power to the motor primary with voltage unbalance of the motor primary for high braking action of the motor, of impedance and means to subject the motor primary while under the influence of said auto-transformer to influence by said impedance to reduce the braking action of the motor to different degrees selectively, each step of reduced braking action being characterized by torque of the motor at zero speed for kick-off.

5. In a braking system for an alternating current motor, the combination with means comprising an auto-transformer to supply power to the motor primary with voltage unbalance of the motor primary for high braking action of the motor, of impedance and means to subject the motor primary while under the influence of said auto-transformer to influence by said impedance to reduce the braking action of the motor to different degrees selectively, all such braking actions of the motor being characterized by some torque of the motor at zero speed, the torque for the high braking action being the reverse of that for the reducing braking actions, and the zero speed torque for reduced braking actions being graduated according to the reduced braking action selected.

6. In combination, a polyphase supply circuit, a polyphase motor, means including an auto-transformer to establish for motor braking action, connections between the motor primary and said supply circuit and to effect unbalance of the motor primary for high braking action of the motor, and means comprising impedance first to increase the impedance between the auto-transformer and one terminal of the motor, then to establish an impedance connection between said motor terminal and one line of said supply circuit and then to disconnect said motor terminal from said auto-transformer, the last mentioned means affording through the medium of such circuit changes graduated reduced braking actions of said motor.

7. In combination, a polyphase supply circuit, a polyphase motor, means including an auto-transformer to establish for motor braking action, connections between the motor primary and said supply circuit and to effect unbalance of the motor primary for high braking action of the motor, and means comprising impedance first to increase the impedance between the auto-transformer and one terminal of the motor, then to establish an impedance connection between said motor terminal and one line of said supply circuit and then to disconnect said motor terminal from said auto-transformer, the last mentioned means affording through the medium of such circuit changes graduated reduced braking actions of said motor, each step of reduced braking action being characterized by torque of the motor at zero speed for kick-off.

8. In combination, a polyphase supply circuit, a polyphase motor, an auto-transformer, means to establish interconnections between said transformer and the motor primary and line connections for both the motor primary and said auto-transformer for high braking action of said motor through unbalancing of the motor primary, and means comprising impedance for first increasing the impedance between an end terminal of the auto-transformer and one terminal of the motor primary for a reduced braking action of said motor, then establishing an impedance connection between said motor terminal and one line of the supply circuit for further reduction of the braking action of said motor, then interrupting the connection between said motor terminal and said end terminal of said auto-transformer for further reduction of the braking action of said motor and then reducing the impedance of the line connection of said motor terminal for further reduction of the braking action of said motor.

9. In combination, a polyphase supply circuit, a polyphase motor, an auto-transformer, means to establish interconnections between said transformer and the motor primary and line connections for both the motor primary and said auto-transformer for high braking action of said motor through unbalancing of the motor primary, and means comprising impedance for first increasing the impedance between an end terminal of the auto-transformer and one terminal of the motor primary for a reduced braking action of said motor, then establishing an impedance connection between said motor terminal and one line of the supply circuit for further reduction of the braking action of said motor, then interrupting the connection between said motor terminal and said end terminal of said auto-transformer for further reduction of the braking action of said motor and then reducing the impedance of the line connection of said motor terminal for further reduction of the braking action of said motor, all steps of braking thus provided being characterized by motor torque at zero speed, the motor torque for the high braking step being the reverse of that for all steps of reduced braking.

10. In combination, a polyphase supply circuit, a polyphase motor, a single phase auto-transformer, means to establish for high braking action of the motor, connection of its primary to said auto-transformer and connection of both to said supply circuit with said auto-transformer across two phases and with an overhanging section of said auto-transformer connected to a terminal of the motor primary, and means comprising impedance to effect graduated reduction of the braking action of the motor by first introducing impedance in the connection between said auto-transformer and said motor terminal, then connecting said motor terminal through impedance to a line of said supply circuit, and then disconnecting said motor terminal from said auto-transformer.

11. A method of reducing the braking action of an alternating current motor having its primary supplied through an auto-transformer for unbalance of the motor primary and for high braking action characterized by some motor torque at zero speed, which comprises the step of including impedance in certain of the connections between the auto-transformer and the motor for a reduced braking action characterized by a reversed motor torque at zero speed.

12. A method of reducing the braking action of an alternating current motor having its primary supplied through an auto-transformer for unbalance of the motor primary and for high braking action characterized by some motor torque at zero speed, which comprises the step of including impedance in certain of the connections between the auto-transformer and the motor for a reduced braking action characterized by a reversed motor torque at zero speed, and which comprises for further reduction of braking action the step of connecting to one line of the supply circuit through an impedance a terminal of the motor primary having the aforementioned impedance connection with the auto-transformer.

13. A method of reducing the braking action of an alternating current motor having its primary supplied through an auto-transformer for unbalance of the motor primary and for high braking action characterized by some motor torque at zero speed, which comprises the step of including impedance in certain of the connections between the auto-transformer and the motor for a reduced braking action characterized by a reversed motor torque at zero speed and which comprises for further reduction of braking action the step of connecting to one line of the supply circuit through an impedance a terminal of the motor primary having the aforementioned impedance connection with the auto-transformer and the step of thereafter disconnecting such motor terminal from the auto-transformer.

14. A method of effecting varying braking action of an alternating current motor having its primary supplied by an auto-transformer for braking which comprises the step of connecting the motor primary to the auto-transformer for braking action characterized by a motor torque in a given direction at zero motor speed and the step of varying the impedance of certain of the motor primary connections relative to other of the same thereby to produce without interruption of the power connections of the motor primary, a reverse motor torque at zero motor speed.

RICHARD B. HUNTER.

REFERENCES CITED

The following references are of record in the file of this patent:

UNITED STATES PATENTS

| Number | Name | Date |
|---|---|---|
| 913,415 | Mershon | Feb. 23, 1909 |
| 2,228,078 | Gulliksen | Jan. 7, 1941 |

FOREIGN PATENTS

| Number | Country | Date |
|---|---|---|
| 212,698 | Switzerland | Mar. 3, 1941 |
| 570,284 | Germany | Jan. 26, 1933 |